(12) United States Patent
Yang

(10) Patent No.: US 11,650,933 B2
(45) Date of Patent: *May 16, 2023

(54) CLASSIFYING ACCESS FREQUENCY OF A MEMORY SUB-SYSTEM COMPONENT

(71) Applicant: Micron Technology, Inc., Boise, ID (US)

(72) Inventor: Yue Yang, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/370,562

(22) Filed: Jul. 8, 2021

(65) Prior Publication Data

US 2021/0406198 A1    Dec. 30, 2021

Related U.S. Application Data

(63) Continuation of application No. 16/555,856, filed on Aug. 29, 2019, now Pat. No. 11,080,205.

(51) Int. Cl.
*G06F 12/00* (2006.01)
*G06F 12/123* (2016.01)
*G06F 12/02* (2006.01)
*G06F 12/0882* (2016.01)

(52) U.S. Cl.
CPC ........ *G06F 12/123* (2013.01); *G06F 12/0246* (2013.01); *G06F 12/0253* (2013.01); *G06F 12/0882* (2013.01); *G06F 2212/7211* (2013.01)

(58) Field of Classification Search
CPC ............... G06F 12/123; G06F 12/0246; G06F 12/0253; G06F 12/0882; G06F 2212/7211; G06F 2212/1044; G06F 2212/7203; G06F 2212/7205; G11C 16/3495

See application file for complete search history.

(56) References Cited

U.S. PATENT DOCUMENTS

| 9,135,160 | B1 | 9/2015 | Zheng et al. |
| 10,509,721 | B2 * | 12/2019 | Bennett ................. G06F 3/0649 |
| 2009/0138654 | A1 | 5/2009 | Sutardja |

(Continued)

FOREIGN PATENT DOCUMENTS

| CN | 1698036 A | 11/2005 |
| CN | 105183386 A | 12/2015 |

(Continued)

OTHER PUBLICATIONS

China National Intellectual Property Administration, "First Office Action," issued in connection with Chinese Application No. 202010878921.3, dated Sep. 23, 2021 (9 pages).

*Primary Examiner* — John A Lane
(74) *Attorney, Agent, or Firm* — Holland & Hart LLP

(57) ABSTRACT

A system detects a request for an access operation relating to an address of a component of a memory sub-system, determines a number of access operations pertaining to the particular address using at least one of a plurality of counters. The plurality of counters comprises an extended counter corresponding to an extended period of time and a recent counter corresponding to a recent period of time. The system assigns an access frequency classification to at least one of the address or the component of the memory sub-system based on the number of access operations pertaining to the particular address.

20 Claims, 6 Drawing Sheets

(56) References Cited

U.S. PATENT DOCUMENTS

| | | | |
|---|---|---|---|
| 2011/0225346 A1* | 9/2011 | Goss | G06F 12/0246 |
| | | | 711/170 |
| 2014/0304480 A1 | 10/2014 | Tang et al. | |
| 2016/0170682 A1 | 6/2016 | Bakshi et al. | |
| 2018/0101314 A1 | 4/2018 | Tai et al. | |
| 2019/0138437 A1 | 5/2019 | Bennett et al. | |
| 2019/0198113 A1 | 6/2019 | Ben-rubi et al. | |
| 2019/0213218 A1 | 7/2019 | Sharifi Tehrani et al. | |
| 2019/0377494 A1 | 12/2019 | Rao et al. | |
| 2020/0110544 A1 | 4/2020 | Zhu et al. | |

FOREIGN PATENT DOCUMENTS

| | | | | |
|---|---|---|---|---|
| CN | 105589895 A | 5/2016 | | |
| CN | 105608014 A | 5/2016 | | |
| CN | 107678976 A | 2/2018 | | |
| WO | WO-2016135955 A1 * | 9/2016 | | G06F 12/00 |

* cited by examiner

CLASSIFYING ACCESS FREQUENCY OF A MEMORY SUB-SYSTEM COMPONENT

CROSS REFERENCE

The present Application for Patent is a continuation of U.S. patent application Ser. No. 16/555,856 by Yang, entitled "CLASSIFYING ACCESS FREQUENCY OF A MEMORY SUB-SYSTEM COMPONENT," filed Aug. 29, 2019, assigned to the assignee hereof, and is expressly incorporated by reference in its entirety herein.

TECHNICAL FIELD

The following relates generally to a memory sub-system and more specifically to classifying access frequency of a memory sub-system component.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

DETAILED DESCRIPTION

Figure 1:
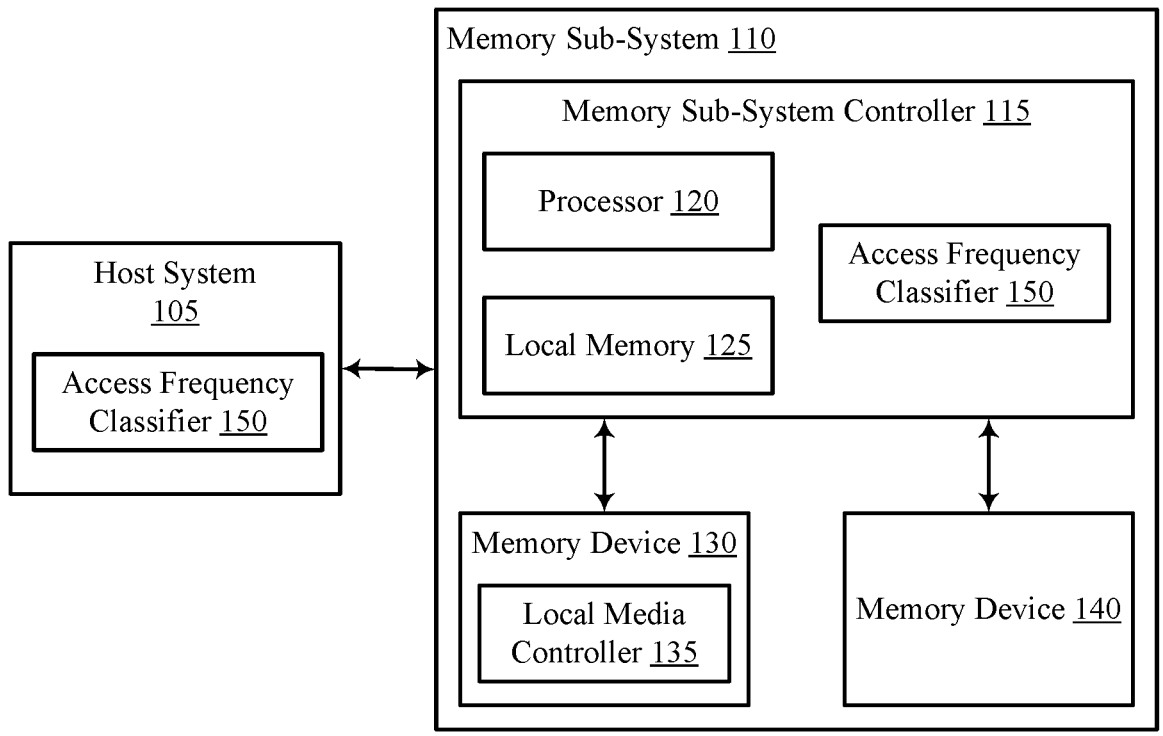
FIG. 1 illustrates an example of a computing environment in accordance with examples as disclosed herein.

Aspects of the present disclosure are directed to classifying access frequency of a memory sub-system component. A memory sub-system can be a storage device, a memory module, or a hybrid of a storage device and memory module. Examples of storage devices and memory modules are described with reference to FIG. 1. In general, a host system can utilize a memory sub-system that includes one or more memory devices that store data. The host system can provide data to be stored at the memory sub-system and can request data to be retrieved from the memory sub-system.

The host system can send access requests (e.g., write command, read command) to the memory sub-system, such as to store data at the memory sub-system and to read data from the memory sub-system. The data to be read and written, as specified by a host request, is hereinafter be referred to as host data.

The memory sub-system can include non-volatile memory devices. A non-volatile memory device is a package of one or more dice. The dice in the packages can be assigned to one or more channels for communicating with a memory sub-system controller. The non-volatile memory devices include cells (i.e., electronic circuits that store information), that are grouped into pages to store bits of data. An example of non-volatile memory devices is three-dimensional cross-point ("3D cross-point") memory devices that are a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1.

Some non-volatile memory devices, such as 3D cross-point memory devices, can group pages across dice and channels to form management units (MUs). A MU can include user data and corresponding metadata. A memory sub-system controller can send and receive user data and corresponding metadata as management units to and from memory devices. A super management unit (SMU) can be a group of one or more MUs that are managed together. For example, a memory sub-system controller can perform media management operations (e.g., wear level operations, refresh operations, scrub operations, etc.) on SMUs. For another type of non-volatile memory device, such as NAND, pages can be grouped to form a block.

A host system request can include a logical address for the host data, which is the location the host system associates with the host data. The logical address can be part of metadata for the host data. The logical address can be for a page, a block, a MU, a SMU, or a sub-SMU, which is a portion of the MUs included in an SMU.

Access operations can be performed by a memory sub-system on memory devices and can include read operations, erase operations, write operations, re-write operations etc. The access operations can, over time, reduce the effectiveness of the memory cells within the memory device and can cause wear in the memory cell. In particular, the storing of data at a memory device can increase the wear of the memory device. After a threshold amount of write operations, the wear can cause the memory device to become unreliable so that data can no longer be reliably stored and retrieved from the memory device. At such a point, the memory sub-system can result in a failure when any of the memory devices fails. In some cases, wear of some memory cells can be different than the wear of other memory cells within the memory device. Unevenness in the wearing of the memory cells can be due to some memory cells being accessed more frequently compared with other memory cells. In some cases, the memory cells within the memory device can have a reduced read/write life due to being accessed more frequently than other memory cells within the memory device. Such wearing can be increased further as storage system capacity scales (e.g., in larger storage capacity memory devices), as data object (e.g., data in an LBA) granularity becomes finer (e.g., smaller, such as smaller than 4 kilobytes), and data object access pattern varies over time (e.g., dynamic changes in the access pattern and/or access frequency of a memory address). Further, the overall life of the memory device can be negatively affected by having some memory cells that wear out faster than other memory cells.

Wear leveling is a process that helps reduce premature wear in memory devices by distributing write operations across the memory devices. Wear leveling includes a set of operations to determine which physical media (e.g., set of memory cells) to use each time data is programmed to help ensure that certain physical sets of memory cells are not written and erased more often than others.

Aspects of the present disclosure address the above and other deficiencies by having a memory sub-system that includes an identification scheme to classify the frequency of accessing components of the memory sub-system. The components can include user data stored on the memory sub-system, addresses (logical addresses, physical addresses), MUs, SMUs, and the like. In some embodiments, there are two classifications that include "hot" for frequent access and "cold" for infrequent access. For example, the identification scheme can identify hot data and cold data in the memory sub-system. In other embodiments, identification scheme includes more than two classifications.

The identification scheme can use multiple counters to track access operations across different durations of time. One set of counters can be used to track access operations over an extended duration of time, and another set of counters can track the access operations over a more recent time period, for example, to reflect recency information. For example, the identification scheme can use the set of counters for the recent time duration, additionally or alternatively to using the set of counters for extended time duration, to classify the addresses as hot addresses.

The identification scheme can also implement a data transfer (i.e., data swapping) operation to reflect the recency information (e.g., recent changes in the frequency of access operations of the set of memory cells), which can improve the accuracy and adaptivity of the identification scheme. For example, the memory sub-system can determine that a transfer condition (i.e., swapping condition) is satisfied and reset data of the second counter and/or transfer data (i.e., values of one or more counters) between the set of counters for the extended time duration and the set of counters for the recent time duration, which can reduce the number of counters that reach an overflow state as well as indicating recency information. Using two counters (which can be examples of bloom filters) associated with different time durations can increase the amount of information that can be captured by the counters, reduce a likelihood that counters reach an overflow state, and indicate recency information.

Such an identification scheme can enable the memory sub-system to determine frequency information that indicates how frequent or infrequent a component is accessed, that reflects recency information such as recent changes in the frequency of access operations of the components of the memory sub-system, which can further improve the accuracy and adaptivity of the identification scheme. In some embodiments, the identification scheme can also enable the memory sub-system to perform one or more media management operations using the frequency information (e.g., hotness information). For example, as part of a wear-leveling operation, the memory sub-system can move data from hot regions (e.g., components that are accessed relatively frequently, such as addresses) to cold regions (e.g., components that are accessed relatively infrequently) in order to level the wear throughout the memory device and increase the life of the memory device. The identification scheme can also enable increased data throughput and reduced latency in the memory sub-system, reduced resource contention at a central processing unit (CPU) (e.g., processing device) of the memory sub-system, among other advantages.

Features of the disclosure are initially described in the context of a computing environment as described with reference to FIG. 1. Features of the disclosure are described in the context of flow charts and memory system architectures as described with reference to FIGS. 2 and 3. These and other features of the disclosure are further illustrated by and described with reference to a computer diagram that relates to classifying access frequency of memory sub-system components as described with references to FIG. 4.

FIG. 1 illustrates an example of a computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 105 that is coupled to one or more memory sub-systems 110. In some embodiments, the host system 105 is coupled to different types of memory sub-system 110. FIG. 1 illustrates one example of a host system 105 coupled to one memory sub-system 110. The host system 105 uses the memory sub-system 110, for example, to write data to the memory sub-system 110 and read data from the memory sub-system 110. As used herein, "coupled to" generally refers to a connection between components or devices, which can be an indirect communicative connection or direct communicative connection (e.g., without intervening components or devices), whether wired or wireless, including connections such as electrical, optical, magnetic, etc.

The host system 105 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes a memory and a processing device. The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 105 and the memory sub-system 110. The host system 105 can further utilize an NVM Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type and NAND type memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 cannot include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear-leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 can be locally managed memory devices, which is a raw memory device combined with a local media controller 135 that performs memory management operations on the memory device 130 within the same memory device package.

The memory sub-system 110 includes an access frequency classifier 150 for assigning an access frequency classification to one or more components of a memory sub-system in accordance with some embodiments of the present disclosure. The access frequency classifier 150 can assign an access frequency classification to an address (logical or physical) pertaining to a memory device of the memory sub-system, a component of the memory sub-system that is related to the address, data being stored at a location pertaining to the address, or one or more combinations or multiples of such.

The access frequency classification can indicate how relatively frequent or infrequent, for example, an address is accessed, data stored at a location related to the address is accessed, or a memory sub-system component is accessed. The access frequency classifier 150 can use two or more classifications to represent various degrees of frequency. In some embodiments, there are two classifications, such as frequently accessed (also hereinafter referred to as "hot") and infrequently accessed (also hereinafter referred to as "cold"). In some embodiments, the various classifications are represented by values. Other types of classification schemes are described in greater detail below in conjunction with FIG. 2. In some examples, the memory sub-system controller 115 includes at least a portion of the access frequency classifier 150. For example, the memory sub-system controller 115 can include a processor 120 (e.g., a processing device) configured to execute instructions stored in local memory 125 for performing the operations described herein. In some examples, the access frequency classifier 150 is part of the host system 105, an application, or an operating system.

The access frequency classifier 150 can be software of the host system 105. The software can include logic and/or instructions to perform the operations described herein. The software can include a call stack. The call stack can include two interfaces, an insertion interface and a query interface. The insertion interface can capture (i.e., record, store, or track) an access of an address of the memory sub-system, such as an LBA, a MU, an SMU, among other examples of addresses. The query interface can report (i.e., determine, transmit, or consolidate) frequency information of the address, such as a frequency status of the address (e.g., a hot address or a cold address).

The access frequency classifier 150 can track a quantity of access operations performed at one or more addresses using one or more counters. For example, the access frequency classifier 150 can detect an access operation at an address and increment at least one counter associated with an extended time period, or increment at least one counter associated with a recent time period that, or both. The access frequency classifier 150 can determine whether a threshold value is satisfied by one or more counts (i.e., values) of the counters, and classify the address and/or another component of the memory sub-system accordingly. The components can include user data stored on the memory sub-system, addresses (logical addresses, physical addresses), MUs, SMUs, and the like. In some examples, the access frequency classifier 150 can also perform a media management operation such as a wear-leveling operation based on classifying the component (e.g., address), for example, as hot or cold. The classifications can be relative classifications. That is, the classifications are made relative to the access operations being tracked. The access frequency classifier 150 can update classifications with each detection of an access operation, periodically, or based on a trigger condition. Further details with regards to the operations of the access frequency classifier 150 are described below.

Figure 2:
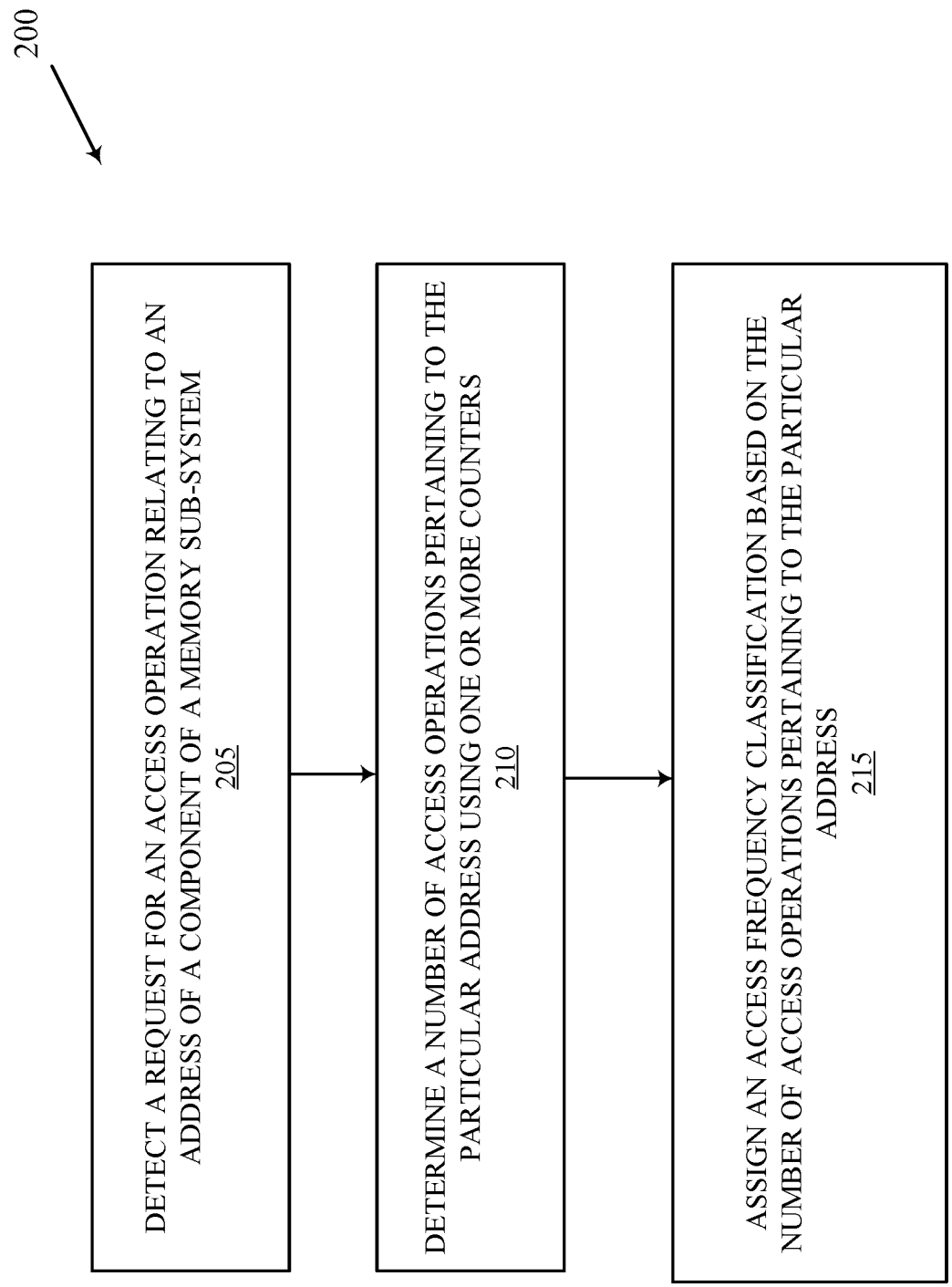
FIG. 2 is a flow diagram of an example method to classify access frequency of components of the memory sub-system in accordance with some embodiments of the present disclosure.

FIG. 2 is a flow diagram of an example method 200 for assigning an access frequency classification in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the access frequency classifier 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing logic detects a request for an access operation relating to an address of a component of a memory sub-system. The component is can be a page, a block, a management unit, or a super management unit. The address can be a logical address or a physical address. The access operation can be a read operation, write operation, erase operation. The processing logic can detect the request, for example, by receiving the request for a host system. For example, the processing logic may receive a host command for a read operation, write operation, or an erase operation.

At operation 210, the processing logic determines a number of access operations pertaining to the particular address using one or more counters. The counters include an extended counter corresponding to an extended period of time and a recent counter corresponding to a recent period of time. The extended period of time is longer than and beginning before the recent period of time. In one embodiment, the counters are counting bloom filters. Determining the number of access operations pertaining to the particular address using multiple counting bloom filters is described in greater detail below in conjunction with FIG. 4.

Referring to FIG. 2, at operation 215, the processing logic assigns an access frequency classification based on the number of access operations pertaining to the particular address. The processing logic can assign the access frequency classification to the address, the component of the memory sub-system, one or more other components of the memory sub-system, or a combination of such. Assigning an access frequency classification can include changing a current classification of the address, the component of the memory sub-system, one or more other components of the memory sub-system.

The use multiple classifications to represent various degrees of frequency. In some embodiments, there are two classifications, such as frequently accessed. In some embodiments, there are more than two classifications to represent various degrees of frequency. For example, the access frequency classifier 150 may use three classifications, such as "high", "medium", and "low." In some embodiments, the various classifications are represented by values.

The processing device can map the classification assigned to the address to the data stored at the address or to another component of the memory sub-system, or both. The components can include user data stored on the memory sub-system, addresses (logical addresses, physical addresses), MUs, SMUs, and the like. For example, the processing device can assign the data stored at the address as "hot" or "cold". In another example, the address may be an LBA and the processing device may classify the LBA as a hot address. The processing device can map the classification to the physical address that corresponds to the LBA. For example, the processing device may classify a physical MU address, a physical SMU address, or both, which correspond to the LBA, as hot addresses.

In some embodiments, the processing logic performs one or more media management operations on the memory sub-system based on the access frequency classification. A media management operation can be, for example, a wear leveling operation, a garbage collection operation, or a caching assignment operation.

The wear-leveling operation can move data from hot regions (e.g., data located in hot addresses that are accessed relatively frequently) to cold regions (e.g., cold addresses that are accessed less frequently than the hot addresses). The regions can be moved at an MU level, an SMU level, a sub-SMU level, among other examples. The wear-leveling operation can mitigate the wear of the hot regions and extend the life of the memory device. In some cases, the methods described herein can include transferring at least a portion of data of a hot address to a cold address, at least a portion of data of a cold address to a hot address, or a combination thereof. Additionally, performing the wear-leveling operation can include operations, features, means, or instructions for performing the wear-leveling operation for an MU, an SMU, a portion of the SMU, or a combination thereof.

Additionally or alternatively, the processing logic can perform a cache assignment operation based on frequency information (e.g., various degrees of frequency). The cache assignment operation can promote cache efficiency in the memory sub-system. For example, the processing logic can move hot data (i.e., hot data objects) to a cache of the memory sub-system and move cold data to non-volatile memory (e.g., write operation memory, read operation memory, or both). Such a cache assignment operation can reduce data access (e.g., write traffic) of the non-volatile memory by directing the data access to the cache, which can in turn reduce the wear of the non-volatile memory (e.g., because the non-volatile memory can have a skewed access pattern).

In some examples, the processing logic can also perform a garbage collection operation based on the frequency information (e.g., when the memory sub-system is an SSD device). For example, the processing logic can identify cold data (e.g., a cold LBA address) and can clear the cold data (i.e., reset the cold data) during an off-peak time (e.g., a period of time with relatively low data traffic), for example, to ensure high write speeds during normal operations (e.g., a period of time with relatively high data traffic).

In some embodiments, the counters are incremented prior to the determining of the number of access operations for the particular address.

Figure 3:
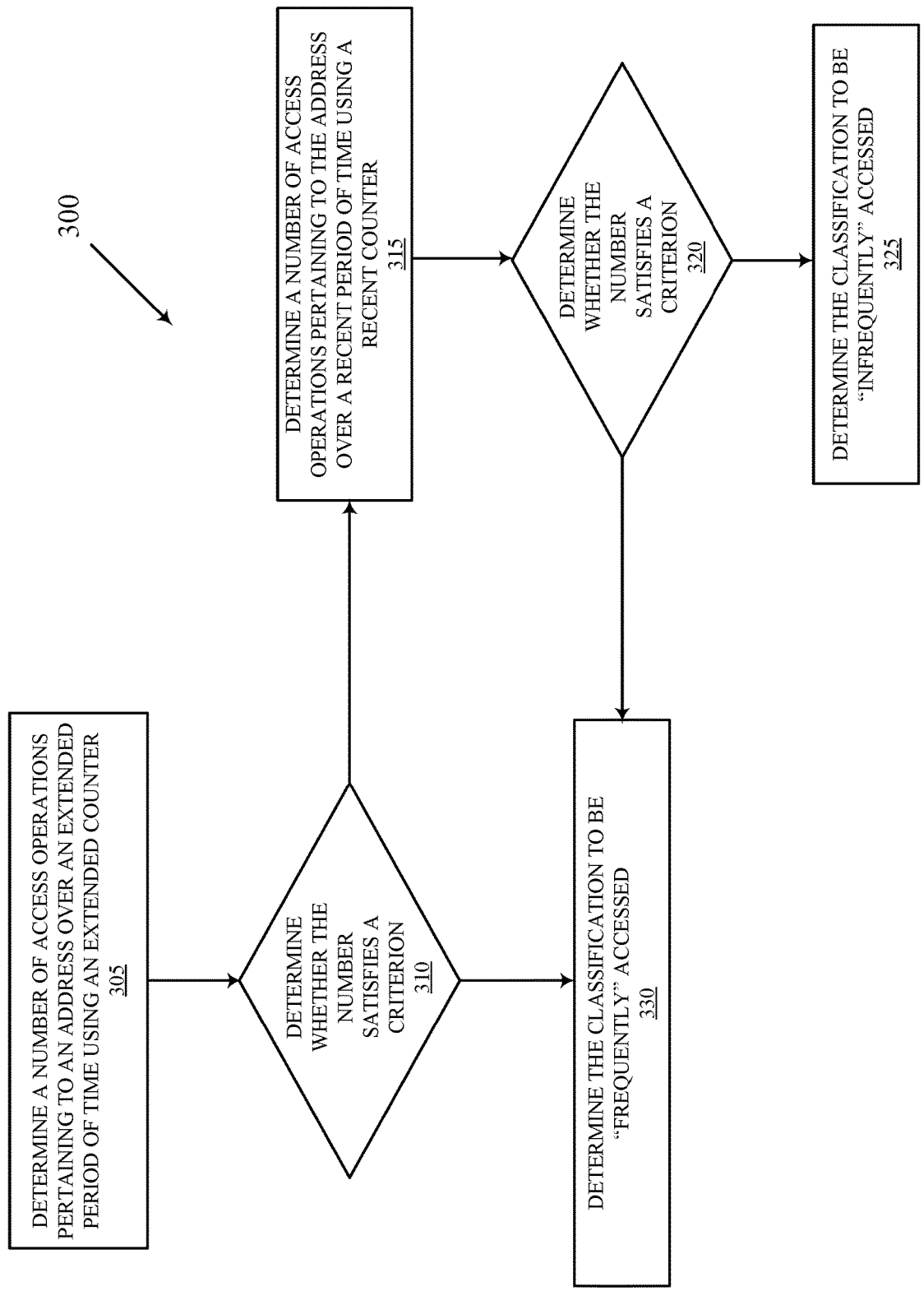
FIG. 3 is a flow diagram of an example method for using multiple counters to classify a frequency of accessing a component of a memory sub-system in accordance with some embodiments of the present disclosure.

FIG. 3 is a flow diagram of an example method 300 for using multiple counters to classify a frequency of accessing a component of a memory sub-system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the access frequency classifier 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic determines a number of access operations pertaining to an address over an extended period of time using an extended counter. Determining the number of access operations pertaining to the address using a counting bloom filter as an extended counter is described in greater detail below in conjunction with FIG. 4.

Referring to FIG. 3, at operation 310, the processing logic determines whether the number of access operations over the extended period of time satisfies a criterion. The criterion can be a threshold. The threshold can be pre-defined and configurable.

If the number of access operations over the extended period of time satisfies the criterion (at operation 310), the processing logic determines the classification to be "frequently accessed", or the like, at operation 330. The classification can be assigned to the address, the component of the memory sub-system, one or more other components of the memory sub-system, data stored at location corresponding to the address, or a combination of such.

If the processing logic determines that the number of access operations over the extended period of time fails to satisfy the criterion (at operation 310), the processing logic determines a number of access operations pertaining to the address over a recent period of time using a recent counter at operation 315. Determining the number of access operations pertaining to the address using a counting bloom filter as a recent counter is described in greater detail below in conjunction with FIG. 4.

Referring to FIG. 3, at operation 320, the processing logic determines whether the number of access operations over the recent period of time satisfies a criterion. In some embodiments, the criterion at operation 320 is the same as the criterion at operation 310. In other embodiments, the criterion at operation 320 is different from the criterion at operation 310.

If the processing logic determines that the number of access operations over the extended period of time fails to satisfy the criterion (at operation 310), the processing logic determines the classification to be "infrequently accessed", or the like at operation 325. The classification can be assigned to the address, the component of the memory sub-system, one or more other components of the memory sub-system, data stored at location corresponding to the address, or a combination of such.

If the processing logic determines that the number of access operations over the extended period of time satisfies the criterion (at operation 310), the processing logic determines the classification to be "frequently accessed" at operation 330. The classification can be assigned to the address, the component of the memory sub-system, one or more other components of the memory sub-system, data stored at location corresponding to the address, or a combination of such.

Figure 4:
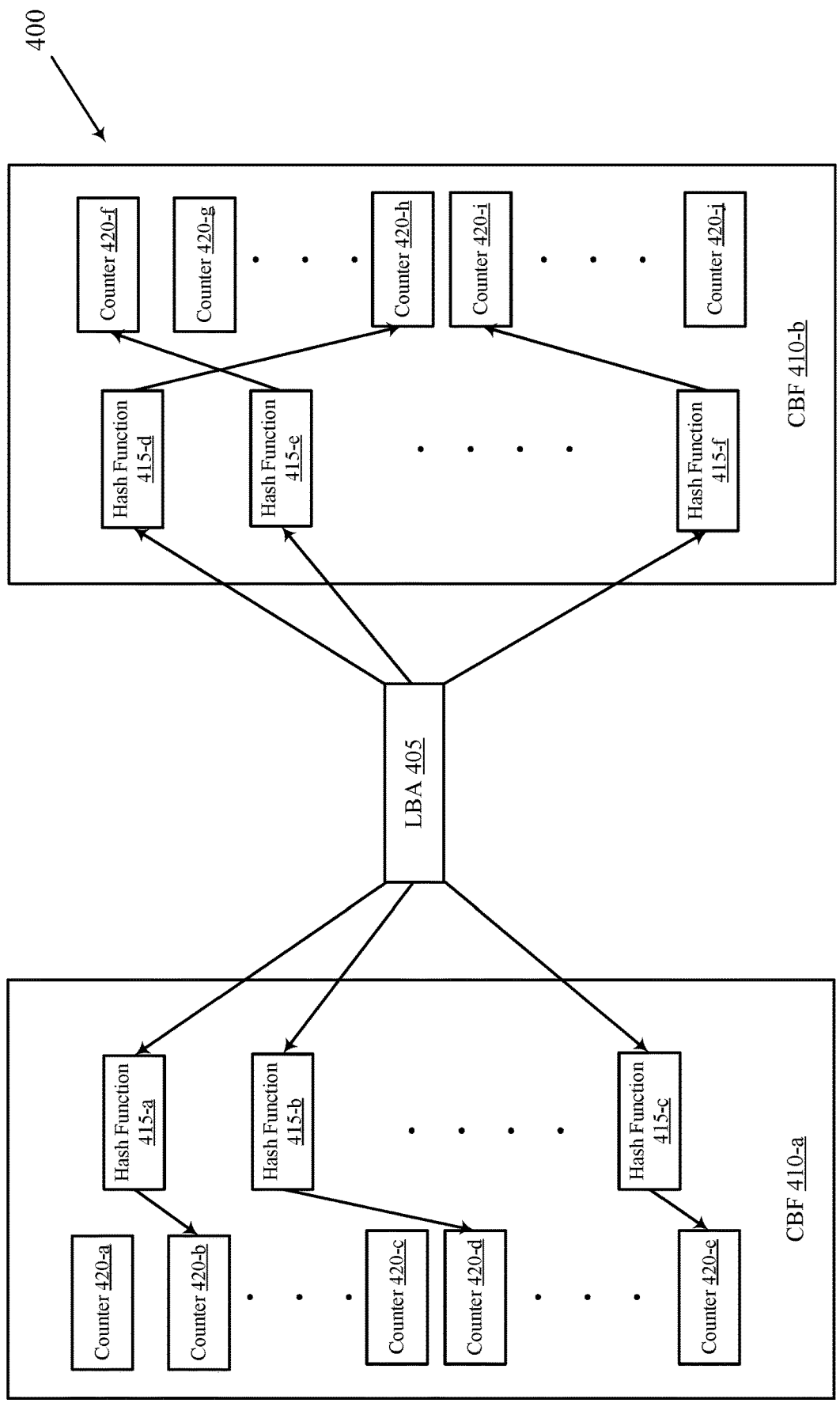
FIG. 4 illustrates an example of an architecture in accordance with examples as disclosed herein.

FIG. 4 is a block diagram of an example architecture 400 for determining the number of access operations pertaining to an address using multiple counting bloom filters in accordance with some embodiments of the present disclosure. The architecture 400 can implement aspects of computing environment 100, method 200, and method 300. Architecture 400 can enable a memory sub-system (e.g., memory sub-system 110) to implement an identification scheme to determine, classify, and/or report frequency information for the memory sub-system or a portion of the memory sub-system.

In some cases, the methods described herein can include identifying an access operation performed on the address using an insertion interface of the memory sub-system, where tracking the quantity of access operations can be based on identifying the access operation performed on the address, and reporting whether the address can be classified as a hot address or a cold address based on a query interface of the memory sub-system.

The architecture 400 includes multiple counters. As an example, the counters can be counting bloom filters, counting bloom filter (CFB) 410-*a* and CFB 410-*b*. The architecture 400 can also include one or more CBFs 410. A counting bloom filter can be a bloom filter variant extending the bloom filter capability from a "membership query" to a "frequency query." That is, a bloom filter can report whether an element is included in a set of elements, and a CBF 410 can report how many times the element has occurred (e.g., been addressed).

The architecture 400 can include an address. A logical address (e.g., LBA 405) is used as one example of an address. The LBA 405 can be an indication or a representation of a physical location of blocks of data (e.g., data in a set of memory cells) in the memory sub-system. In some examples, the memory sub-system (e.g., a controller of the memory sub-system) can perform an access operation to the LBA 405. The access operation can include a read operation, an erase operation, a write operation, a re-write operation, among other examples. The architecture 400 can enable the memory sub-system to track one or more such access operations performed on the LBA 405, determine frequency information of the LBA 405 (e.g., a classification of the LBA 405 as a hot address or a cold address), and perform media management operations based on the determined frequency information.

The architecture 400 can include a CBF 410-*a* and a CBF 410-*b*. The CBF 410-*a* and the CBF 410-*b* can be examples of the CBF-a and the CBF-b, respectively, as described with reference to FIG. 2. The CBF 410-*a* and the CBF 410-*b* can record an access operation performed on the LBA 405 using one or more hash functions 415 to increment one or more counters 420. The CBF 410-*a* can track a quantity of access operations performed on the LBA 405 over a first period of time (e.g., a relatively more recent time window, such as a 1-month period from the past to the present). The CBF 410-*b* can track a quantity of access operations performed on the LBA 405 over a second period of time (e.g., a relatively wider time window, such as a 3-month period from the past to the present).

The architecture 400 can include counters 420. The counters 420 can be values stored in the memory sub-system. For example, the counters 420 can be a number of bits representing a value (e.g., 4 bits to capture a relatively large quantity of access operations while maintaining a relatively small memory space constraint). The architecture 400 can enable the memory sub-system to increment one or more of the counters 420 to track access operations performed on the LBA 405, and/or other LBAs in the memory sub-system.

In some examples, upon detecting and/or performing an access operation to the LBA 405, the CBF 410-*a* can identify one or more counters 420 to increment based on one or more of the hash functions 415. An identifier of the LBA 405, such as an index of the LBA 405 or some other identifier for the LBA 405, can be input to k hash functions 415. For example, the identifier (e.g., number) of the LBA 405 can be input to hash functions 415-*a*, 415-*b*, and 415-*c* (e.g., k=3). The hash functions 415-*a*, 415-*b*, and 415-*c* can process the identifier of the LBA 405 and can output the indices of a subset of k counters 420 of the N counters 420. For example, the k hash functions 415 can output the indices of k counters 420-*b*, 420-*d*, and 420-*e* (e.g., k=3 of the N counters). The counters 420-*b*, 420-*d*, and 420-*e* can be a subset of the N counters 420 in the CBF 410-*a*, the subset being associated with the LBA 405 and incremented when an access operation is performed on the LBA 405. Incrementing the subset can enable the architecture 400 to track a quantity of access operations performed on the LBA 405 over the first period of time (e.g., a more recent period of time).

Additionally, the CBF 410-*b* can identify one or more counters 420 to increment based on one or more of the hash functions 415. A number of the LBA 405, such as an index of the LBA 405 or some other identifier for the LBA 405, can be input to k hash functions 415. For example, the number of the LBA 405 can be input to hash functions 415-*d*, 415-*e*, and 415-*f* (e.g., k=3). The hash functions 415-*d*, 415-*e*, and 415-*f* can process the number of the LBA 405 and can output the indices of a subset of k counters 420 of the N counters 420 in the CBF 410-*b*. For example, the k hash functions 415 can output the indices of k counters 420-*f*, 420-*h*, and 420-*i* (e.g., k=3 of the N counters). The counters 420-*f*, 420-*h*, and 420-*i* can be a subset of the N counters 420 in the CBF 410-*b*, the subset being associated with the LBA 405 and incremented when an access operation is performed on the LBA 405. Incrementing the subset can enable the architecture 400 to track a quantity of access operations performed on the LBA 405 over the second period of time (e.g., a longer period of time).

In some examples, two or more of the k hash functions 415 can address the same counter 420. In such examples, the same counter 420 is incremented one time (i.e., k' distinct counters are incremented, where k'≤k addressed counters). In some cases, the CBF 410-*a* and/or the CBF 410-*b* can refrain from incrementing one or more of the counters 420 (e.g., the k' distinct counters) if the CBF 410-*a* and/or the CBF 410-*b* determine that such an incrementation can cause the one or more counters 420 to overflow. A counter 420 can overflow if the value of the counter 420 is at a limit of a range of values that the counter 420 can represent. For example, a counter 420 with a 4 bit size can indicate or represent $2^4=16$ possible values, and can be considered to overflow upon incrementing the counter 420 after the value of the counter 420 reaches 16, although other bit sizes and value ranges can be used.

The memory sub-system can utilize the counters 420 to determine a quantity or an approximate quantity of access operations performed on the LBA 405 over the first time period, the second time period, or both. For example, the memory sub-system can use the counters of CBF 410-*b* to determine or estimate the quantity of access operations performed on the LBA 405 over the second period of time (e.g., the longer time period). The memory sub-system can determine the indices of the subset of counters 420 (e.g., the counters 420-*f*, 420-*h*, and 420-*i*) based on inputting a number of the LBA 405 (e.g., an index of the LBA 405) to the hash functions of the CBF 410-*b* (e.g., the hash functions can output the indices of the subset of k counters 420-*f*, 420-*h*, and 420-*i*). The processing logic can also determine a smallest counter of the subset of counters. For example, the processing logic can compare the values or data contents of each of the k counters (e.g., k' distinct counters) and determine a counter value that is smaller than the other counter values (e.g., the counter 420-*f*). In such examples, the processing logic can use the smaller counter value (e.g., the counter 420-*f*) as the number of access operations over the second time period. The memory sub-system can similarly determine a smaller counter value of the CBF 410-*a* (e.g., counter 420-*b*) to use as the number of access operations over the first time period.

The memory sub-system can compare the determined quantity or approximate quantity of access operations over the second time period (e.g., the longer time period) to a threshold. The threshold can be a value indicating that the quantity of access operations over the second time period is relatively high (i.e., the frequency of data access of the LBA 405 indicates that the LBA 405 is hot data). The LBA 405 can be classified as a hot address based on the comparison.

The memory sub-system can compare the determined quantity or approximate quantity of access operations over the first time period (e.g., the shorter and/or more recent time period) to a second threshold. In some cases, the second threshold is the same as the first threshold. In some cases, the second threshold is different than the first threshold. For example, if the first time period is shorter, a smaller threshold value for the second threshold can be used to more accurately reflect recency information. The LBA 405 can be classified as a hot address or a cold address based on the comparison.

The architecture 400 can be applied to other LBAs. For example, the architecture 400 can be implemented for one or more LBAs, each of which can correspond to one or more of the counters 420 based on the output of one or more hash functions 415 (e.g., after inputting an LBA index of an LBA of the one or more LBAs and incrementing the one or more counters 420 based on an access operation being performed at the LBA).

In some examples, the architecture 400 can be configured to reflect recency information (e.g., to include in frequency information such as hotness information or coldness information of the LBA 405 or other LBAs). For example, the memory sub-system can compare a quantity of operations tracked over a longer time period with a quantity of operations tracked over a shorter time period. In some examples, the memory sub-system can determine that the quantity of operations tracked over the shorter time period is relatively close in value to the quantity of operations tracked over the longer time period. In such examples, the recency information can reflect that a workload pattern has changed, and that the LBA 405 is being accessed more recently than the LBA 405 was accessed historically. In some other examples, the memory sub-system can determine that the quantity of operations tracked over the shorter time period is relatively small in value compared to the quantity of operations tracked over the longer time period. In such examples, the recency information can reflect that a workload pattern has changed, and that the LBA 405 is being accessed less frequently than the LBA 405 was accessed historically.

Additionally or alternatively, the architecture can be configured to reflect recency information by classifying the LBA 405 as a hot address or a cold address based on counting bloom filters that track the access operations over varying time periods, which can ensure that recency information such as recent changes in the frequency of access operations of the LBA 405 is reflected in the determined frequency information of the LBA 405.

In some examples, the architecture 400 can also include a transfer operation (i.e., a swapping operation) to maintain recency information in the CBF 410-a and the CBF 410-b, as well as preventing overflowed counters in the CBFs 410. For example, the memory sub-system can determine that a transfer condition (i.e., a swapping condition) is satisfied. The transfer condition can be satisfied based on one or more parameters. The parameters can include a total number of insertions in the CBF 410-a since the last transfer operation (i.e., a total number of access operations performed of the LBA 405 tracked by the CBF 410-a since the last swapping condition was satisfied). The parameters can also include a total number of counters 420 in the CBF 410-a that have reached an overflowed state (i.e., a threshold number of counters 420 that have overflowed in the CBF 410-a). For example, the memory sub-system can determine that a determined quantity of access operations satisfies a threshold to trigger the transfer operation. Additionally or alternatively, the memory sub-system can determine that a quantity of counters 420 that have reached an overflow condition satisfies a threshold (e.g., 20 percent of the N counters 420) to trigger the transfer operation.

The counters 420 of the CBF 410-b can be changed (e.g., reset to zero) based on the satisfied transfer condition. For example, the memory sub-system can determine that the transfer condition is satisfied and perform a reset (e.g., a rewrite) operation to "wipe" the counters 420 of the CBF 410-b to a base value. Additionally or alternatively, the counters 420 of the CBF 410-a can undergo a transfer operation (i.e., a swapping operation). For example, the counters 420 of the CBF 410-a can be "swapped" with the counters 420 of the CBF 410-b (e.g., data such as the values of the counters 420 can be transferred between the CBF 410-a and the CBF 410-b). Values of the counters 420 of the CBF 410-a can be changed to values of the counters 420 of the CBF 410-b, and the values of the counters 420 of the CBF 410-b can be changed to values of the counters 420 of the CBF 410-a. Such data transfer can reduce the number of counters 420 that reach an overflow state, as well as maintain/reflect recency information in the CBFs 410. In some examples, the reset operation can be performed before or after the transfer operation, independently of the transfer operation, to multiple CBFs 410 (e.g., both CBF 410-a and CBF 410-b), among other examples.

The architecture 400 can enable the memory sub-system to realize one or more of the following advantages. The overall life of the memory sub-system can be increased due to wear-leveling operations utilizing the frequency information determined by the accurate, dynamic, and space efficient identification scheme implemented using the architecture 400. The memory sub-system can also realize reduced data movement (e.g., user data flow) using the operations described herein, which can improve data throughput and latency in the memory sub-system, for example, by reducing an input/output (I/O) bandwidth contention with the user data flow. Additionally or alternatively, a CPU resource contention with user data flow can also be reduced (e.g., in an embedded environment).

The architecture 400 can be relatively space efficient. For example, the CBF 410-a and the CBF 410-b can provide dense data representation (e.g., compact bit representation) with a relatively low false-positive rate (e.g., the rate of identifying a cold address as a hot address). Additionally, the architecture 400 can be accurate and adaptable to capture dynamic changes in hot data in workloads (i.e., memory operation). For example, using the CBF-a and the CBF-b as described herein can reflect real-time hotness changes in the workloads (e.g., included in recency information), and the trigger conditions (i.e., transfer conditions) for the transfer operations can be dynamically updated based on workload characteristics of the memory sub-system, such as a workset size, a ratio of hot data to cold data, recency information, among other examples. Further, the architecture 400 can be scalable and configurable. For example, the design parameters of the architecture 400 (e.g., number of bits per counter, number of N counters per each CBF 410, number of hash functions per CBF 410, and number of CBFs 410) can be configured and/or dynamically updated, which can enable the architecture to have high configurability, scalability under different workloads (e.g., workloads of memory sub-systems with different scales and access patterns), etc.

Figure 5:
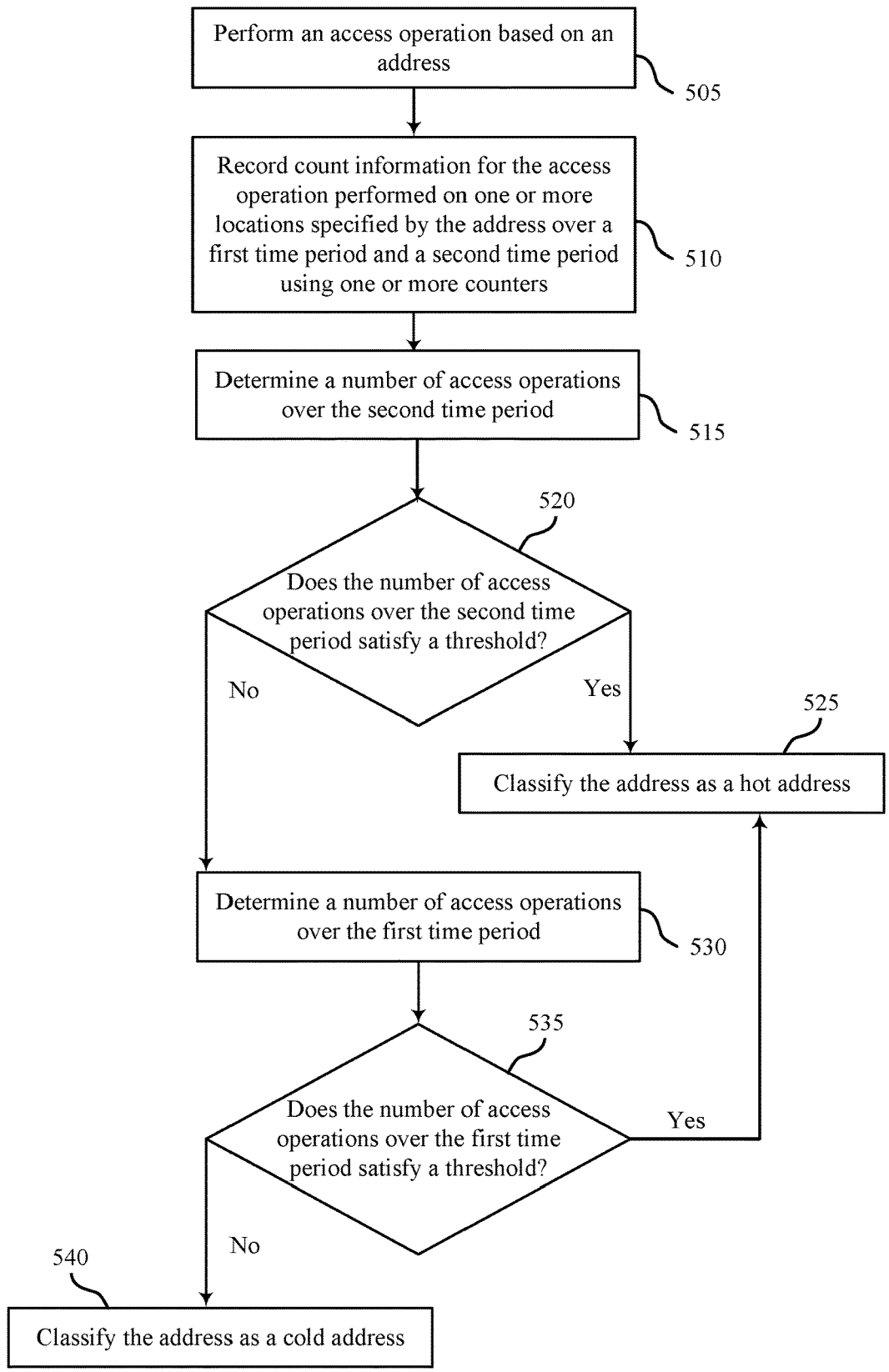
FIG. 5 is a flow diagram of an example method to classify components of the memory sub-system as "hot" or "cold" in accordance with some embodiments of the present disclosure.

FIG. 5 is a flow diagram of an example method 500 to classify components of the memory sub-system as "hot" or "cold" in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the access frequency classifier 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. For example, the method 500 can illustrate a process flow to classify a component (e.g., an address) of a memory sub-system as a hot address because the address is accessed relatively frequently, or a cold address because the address is accessed relatively infrequently. In some embodiments, a memory component such as a memory sub-system controller 115 can include software with processing logic to perform the operations described herein.

The processing logic an identify, classify, and/or report components of the memory sub-system (e.g., data, addresses, pages, blocks, MUs, SMUs, and the like) as "hot" or "cold." At operation 505, the processing logic performs an access operation based on an address. The access operation can be performed based on an address associated with a memory device of a memory sub-system. The address can be a logical address or a physical address. The logical address can be for a page, an MU, a SMU, or a sub-SMU. The physical address can be for a page, a block, an MU, an SMU, a sub-SMU (e.g., a portion of the MUs included in an SMU), among other examples. The address can be for a location in a memory sub-system to store or to retrieve data. The access operation can include a read operation, an erase operation, a write operation, or a re-write operation.

At operation 510, the processing logic records count information for the access operation performed on one or more locations specified by the address over a first time period and a second time period using one or more counters. The locations can be for one or more memory cells, one or more MUs, or one or more SMUs. A counter can be a counting bloom filter. For example, the processing logic can increment at least one counter of a first bloom filter or at least one counter of a second bloom filter (sometimes referred to as counting bloom filters) or both. The first bloom filter can be referred to as CBF-a and the second bloom filter can be referred to as CBF-b. In other examples, CBF-b can be referred to as the first counter or the first bloom filter and CBF-a can be referred to as the second counter or second bloom filter. The CBF-a can track the access operations performed on the address over a first period of time (e.g., a 1-month period). The CBF-b can track the access operations performed on the address over a second period of time longer than the first period of time (e.g., a 3-month period).

In some examples, the CBF-a and/or CBF-b can include a set of N counters. The processing logic can record the access operation performed on the address by incrementing a subset of counters (e.g., a subset of the first set of counters). The subset of counters can include k counters (e.g., where k≤N) and can include the at least one counter of the CBF-a or CBF-b. The processing logic can determine the subset of counters using k hash functions. For example, the processing logic can input the address into the k hash functions and output the indices of each of the k counters in the first set of counters. The processing logic can increment the subset of counters based on the access operation performed at 505.

At 515, the processing logic can determine a number of access operations over the second time period. For example, the processing logic can use the counters of CBF-b to determine or estimate the quantity of access operations performed on the address over the second period of time (e.g., the 3-month period). The processing logic can determine the indices of the subset of counters associated with the address based on inputting a number of the address to the hash functions of the CBF-b (e.g., the hash functions can output the indices of the subset of k counters). The processing logic can also determine a smallest counter of the subset of counters. For example, the processing logic can compare the values or data contents of each of the k counters and determine a counter value that is smaller than the other counter values. In such examples, the processing logic can use the smaller counter value as the number of access operations over the second time period.

At 520, the processing logic can determine whether the number of access operations over the second time period satisfies a threshold. In some examples, the processing logic can determine that the number of access operations satisfies the threshold. For example, the determined number of access operations at 515 can be greater than or equal to a threshold number of access operations indicating that the address is a hot address. That is, the number of access operations performed over the second period of time can be a large enough value to indicate that the address includes hot data (e.g., data that is accessed relatively frequency). In such examples, at 525 the processing logic can classify the address as a hot address.

In some other examples, the processing logic can determine that the number of access operations over the second time period (e.g., the 3-month period) fails to satisfy the threshold. In such examples, at 530 the processing logic can determine a number of access operations over the first time period (e.g., the 1-month period). For example, the processing logic can use the counters of CBF-a to determine or estimate the quantity of access operations performed on the address over the first period of time. The processing logic can determine the indices of the subset of counters associated with the address based on inputting a number of the address to the hash functions of the CBF-a (e.g., the hash functions can output the indices of the subset of k counters). The processing logic can also determine a smallest counter of the subset of counters of the CBF-a. For example, the processing logic can compare the values or data contents of each of the k counters and determine a counter value that is smaller than the other counter values. In such examples, the processing logic can use the smaller counter value as the number of access operations over the first time period.

At 535, the processing logic can determine whether the number of access operations over the first time period (e.g., the more recent time period) satisfies a threshold. In some examples, the threshold for the first time period can be different than the threshold for the second time period. In some other examples, the thresholds can be the same. In some cases, the processing logic can determine that the number of access operations satisfies the threshold. For example, the determined number of access operations can be greater than or equal to a threshold number of access operations of the first time period indicating that the address is a hot address. That is, the number of access operations performed over the first period of time can be a large enough value to indicate that the address includes hot data (e.g., data that is accessed relatively frequency). In such examples, at 525 the processing logic can classify the address as a hot address.

In other examples, the processing logic can determine that the number of access operations over the first time period fails to satisfy the threshold. In such examples, at 540 the processing logic can classify the address as a cold address (e.g., the determined number of access operations can be less than a threshold number of access operation, which can indicate that the address is accessed relatively less frequently than a hot address).

In some examples, the processing logic can perform media management operations based on whether the address is classified as a hot address or a cold address. For example, the processing logic can compile frequency information from multiple addresses (e.g., including the address illustrated in method 500) and determine frequency information (e.g., the hot/cold classifications of each of the multiple addresses) to perform one or more media management operations. In some examples, the processing logic can perform a wear-leveling operation (e.g., based on the frequency information).

Figure 6:
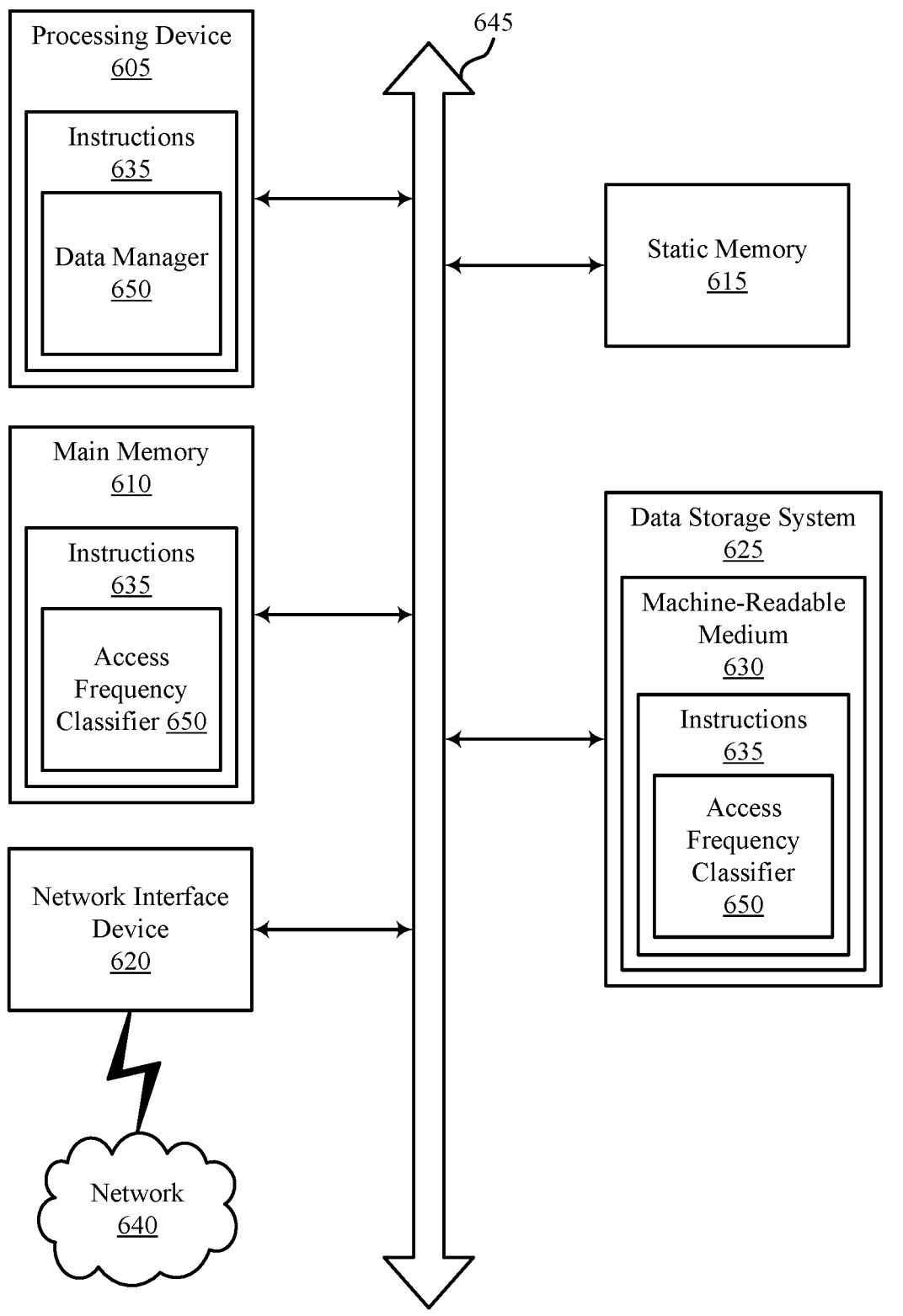
FIG. 6 illustrates an example machine of a computer system that supports classifying access frequency of memory sub-system components in accordance with examples as disclosed herein.

FIG. 6 illustrates an example machine of a computer system 600 that supports classifying access frequency of memory sub-system components in accordance with examples as disclosed herein. The computer system 600 can include a set of instructions, for causing the machine to perform any one or more of the techniques described herein. In some examples, the computer system 600 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the access frequency classifier 150 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 600 can include a processing device 605, a main memory 610 (e.g., read-only memory (ROM), flash memory, DRAM such as synchronous DRAM (SDRAM) or RDRAM, etc.), a static memory 615 (e.g., flash memory, static random access memory (SRAM), etc.), and a data storage system 625, which communicate with each other via a bus 645.

Processing device 605 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 605 can also be one or more special-purpose processing devices such as an application specific integrated circuit (ASIC), a field programmable gate array (FPGA), a digital signal processor (DSP), network processor, or the like. The processing device 605 is configured to execute instructions 635 for performing the operations and steps discussed herein. The computer system 600 can further include a network interface device 620 to communicate over the network 640.

The data storage system 625 can include a machine-readable storage medium 630 (also known as a computer-readable medium) on which is stored one or more sets of instructions 635 or software embodying any one or more of the methodologies or functions described herein. The instructions 635 can also reside, completely or at least partially, within the main memory 610 and/or within the processing device 605 during execution thereof by the computer system 600, the main memory 610 and the processing device 605 also constituting machine-readable storage media. The machine-readable storage medium 630, data storage system 625, and/or main memory 610 can correspond to a memory sub-system.

In one example, the instructions 635 include instructions to implement functionality corresponding to an access frequency classifier 650 (e.g., the access frequency classifier 150 described with reference to FIG. 1). While the machine-readable storage medium 630 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof. Some drawings can illustrate signals as a single signal; however, it will be understood by a person of ordinary skill in the art that the signal can represent a bus of signals, where the bus can have a variety of bit widths.

The terms "electronic communication," "conductive contact," "connected," and "coupled" can refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) can be an open circuit or a closed circuit based on the operation of the device that includes the connected components. The conductive path between connected components can be a direct conductive path between the components or the conductive path between connected components can be an indirect conductive path that can include intermediate components, such as switches, transistors, or other components. In some cases, the flow of signals between the connected components can be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The devices discussed herein, including a memory array, can be formed on a semiconductor substrate, such as silicon, germanium, silicon-germanium alloy, gallium arsenide, gallium nitride, etc. In some cases, the substrate is a semiconductor wafer. In other cases, the substrate can be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, can be controlled through doping using various chemical species including, but not limited to, phosphorous, boron, or arsenic. Doping can be performed during the initial formation or growth of the substrate, by ion-implantation, or by any other doping means.

A switching component or a transistor discussed herein can represent a field-effect transistor (FET) and comprise a three terminal device including a source, drain, and gate. The terminals can be connected to other electronic elements through conductive materials, e.g., metals. The source and drain can be conductive and can comprise a heavily-doped, e.g., degenerate, semiconductor region. The source and drain can be separated by a lightly-doped semiconductor region or channel. If the channel is n-type (i.e., majority carriers are signals), then the FET can be referred to as a n-type FET. If the channel is p-type (i.e., majority carriers are holes), then the FET can be referred to as a p-type FET. The channel can be capped by an insulating gate oxide. The channel conductivity can be controlled by applying a voltage to the gate. For example, applying a positive voltage or negative voltage to an n-type FET or a p-type FET, respectively, can result in the channel becoming conductive. A transistor can be "on" or "activated" when a voltage greater than or equal to the transistor's threshold voltage is applied to the transistor gate. The transistor can be "off" or "deactivated" when a voltage less than the transistor's threshold voltage is applied to the transistor gate.

The description set forth herein, in connection with the appended drawings, describes example configurations and does not represent all the examples that can be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, can be practiced without these specific details. In some instances, well-known structures and devices are shown in block diagram form to avoid obscuring the concepts of the described examples.

In the appended figures, similar components or features can have the same reference label. Further, various components of the same type can be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices (e.g., a combination of a DSP and a microprocessor, multiple microprocessors, one or more microprocessors in conjunction with a DSP core, or any other such configuration).

The functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" can be based on both a condition A and a condition B without departing from the scope of the present disclosure. As used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein can be applied to other variations without departing from the scope of the disclosure. The disclosure is not limited to the examples and designs described herein, but is to be accorded the broadest scope consistent with the principles and novel features disclosed herein.

What is claimed is:

1. A method, comprising:
    detecting a request for an access operation relating to a particular address of a component of a memory sub-system;
    determining, by a processing device, a first number of access operations pertaining to the particular address corresponding to an extended period of time using at least a recent counter that counts access operations pertaining to the particular address corresponding to a recent period of time; and
    assigning an access frequency classification to at least one of the particular address or the component of the memory sub-system based on the first number of access operations pertaining to the particular address.

2. The method of claim 1, wherein the recent period of time is shorter than the extended period of time and begins after the extended period of time begins, and a value of the recent counter indicates recency information associated with the particular address.

3. The method of claim 1, further comprising:
    performing a media management operation on the memory sub-system based on the access frequency classification.

4. The method of claim 3, wherein the media management operation is at least one of a wear leveling operation, a garbage collection operation, or a caching assignment operation.

5. The method of claim 1, further comprising:
    assigning the access frequency classification to data stored at a location pertaining to the particular address.

6. The method of claim 1, wherein the component is at least one of a page, a block, a management unit, or a super management unit.

7. The method of claim 1, wherein the particular address is a logical address or a physical address.

8. The method of claim 1, further comprising:
    incrementing the recent counter prior to the determining of the first number of access operations for the particular address.

9. The method of claim 1, wherein the recent counter comprises a counting bloom filter.

10. The method of claim 1, further comprising:
    determining a second number of access operations pertaining to the particular address using an extended counter corresponding to the extended period of time; and
    determining that the second number of access operations over the extended period of time satisfies a criterion, wherein assigning the access frequency classification comprises:
        classifying at least one of the particular address or the component of the memory sub-system as frequently accessed.

11. The method of claim 1, further comprising:
    determining a second number of access operations pertaining to the particular address using an extended counter corresponding to the extended period of time;
    determining that the second number of access operations over the extended period of time fails to satisfy a first criterion; and
    determining that the first number of access operations over the recent period of time satisfies a second criterion, wherein assigning the access frequency classification comprises:
        classifying at least one of the particular address or the component of the memory sub-system as frequently accessed.

12. The method of claim 1, further comprising:
    determining a second number of access operations pertaining to the particular address using an extended counter corresponding to the extended period of time;
    determining that the second number of access operations over the extended period of time fails to satisfy a first criterion; and
    determining that the first number of access operations over the recent period of time fails to satisfy a second criterion, wherein assigning the access frequency classification comprises:
        classifying at least one of the particular address or the component of the memory sub-system as infrequently accessed.

13. A system, comprising:
    a memory device; and
    a processing device coupled with the memory device, to perform operations comprising:
        detecting a request for an access operation relating to a particular address of a component of a memory sub-system;
        determining a first number of access operations pertaining to the particular address corresponding to an extended period of time using at least a recent counter that counts access operations pertaining to the particular address corresponding a recent period of time; and
        assigning an access frequency classification to at least one of the particular address or the component of the memory sub-system based on the first number of access operations pertaining to the particular address.

14. The system of claim 13, the operations further comprising:
    performing a media management operation on the memory sub-system based on the access frequency classification.

15. The system of claim 13, wherein the component is at least one of a page, a block, a management unit, or a super management unit.

16. The system of claim 13, wherein the recent counter comprises a counting bloom filter.

17. A non-transitory computer-readable storage medium comprising instructions that, when executed by a processing device, cause the processing device to perform operations comprising:
- detecting a request for an access operation relating to a particular address of a component of a memory sub-system;
- determining a first number of access operations pertaining to the particular address corresponding to an extended period of time using at least a recent counter that counts access operations pertaining to the particular address corresponding to a recent period of time; and
- assigning an access frequency classification to at least one of the particular address or the component of the memory sub-system based on the first number of access operations pertaining to the particular address.

18. The non-transitory computer-readable storage medium of claim 17, the operations further comprising:
- performing a media management operation on the memory sub-system based on the access frequency classification.

19. The non-transitory computer-readable storage medium of claim 17, wherein the component is at least one of a page, a block, a management unit, or a super management unit.

20. The non-transitory computer-readable storage medium of claim 17, wherein the recent counter comprises a counting bloom filter.

* * * * *